(12) United States Patent
Salvatore (10) Patent No.: US 10,309,433 B2
(45) Date of Patent: Jun. 4, 2019

(54) MAGNETIC SECURING SYSTEM

(71) Applicant: Karen Salvatore, Needham, MA (US)

(72) Inventor: Karen Salvatore, Needham, MA (US)

( * ) Notice: Subject to any disclaimer, the term of this patent is extended or adjusted under 35 U.S.C. 154(b) by 0 days.

(21) Appl. No.: 15/594,616

(22) Filed: May 14, 2017

(65) Prior Publication Data
US 2017/0328388 A1    Nov. 16, 2017

Related U.S. Application Data

(60) Provisional application No. 62/335,937, filed on May 13, 2016.

(51) Int. Cl.
*F16B 1/00* (2006.01)
*F16M 13/02* (2006.01)

(52) U.S. Cl.
CPC ............. *F16B 1/00* (2013.01); *F16M 13/022* (2013.01); *F16B 2001/0035* (2013.01)

(58) Field of Classification Search
CPC .. F16B 1/00; F16B 2001/0035; F16M 13/022
See application file for complete search history.

(56) References Cited

U.S. PATENT DOCUMENTS

| | | | | |
|---|---|---|---|---|
| 2,975,497 A * | 3/1961 | Budreck | ............. | A44B 15/002 24/303 |
| 3,041,697 A * | 7/1962 | Budreck | ............. | A44B 15/002 24/303 |
| 3,141,216 A * | 7/1964 | Haskell | ................... | A41F 1/002 24/303 |
| 4,447,238 A * | 5/1984 | Eldridge, Jr. | ......... | A61M 25/02 128/DIG. 26 |
| 5,450,658 A * | 9/1995 | Hicks | ................... | A41B 11/002 24/303 |
| 5,682,648 A * | 11/1997 | Miller | ....................... | A45F 5/08 24/303 |
| 5,682,653 A * | 11/1997 | Berglof | ..................... | G09F 1/10 224/183 |
| 6,092,241 A * | 7/2000 | Bellet | .................. | A41B 11/002 2/239 |
| 6,833,507 B2 * | 12/2004 | Arkin | ..................... | B60R 11/00 174/135 |
| 9,078,510 B2 * | 7/2015 | Liao | .......................... | A45F 5/10 |
| 2003/0005558 A1* | 1/2003 | Wong | ..................... | A41F 1/006 24/303 |
| 2006/0005361 A1* | 1/2006 | O' Banion | ............... | A42B 1/24 24/303 |
| 2006/0282993 A1* | 12/2006 | Dietz | .................... | A45C 11/34 24/303 |

(Continued)

*Primary Examiner* — Robert Sandy
*Assistant Examiner* — David M Upchurch
(74) *Attorney, Agent, or Firm* — Brian M. Dingman; Dingman IP Law, PC (57) ABSTRACT

A magnetic securing system with first and second backers, each with a magnet embedded therein. The first backer is constructed and arranged to be placed on one side of an article, and the second backer is constructed and arranged to be placed on another side of the article such that the two magnets attract, to hold the backers in place on the article. There is a first structure that is coupled to or can be coupled to the first backer. The first structure is constructed and arranged to be used to support another object, such that the system is able to allow objects to be removably coupled to the article.

18 Claims, 8 Drawing Sheets

(56) References Cited

U.S. PATENT DOCUMENTS

| | | | |
|---|---|---|---|
| 2010/0083699 A1* | 4/2010 | Conigliaro | A44C 15/003 63/1.18 |
| 2011/0056437 A1* | 3/2011 | Sprung | A01K 63/006 119/51.04 |
| 2013/0048827 A1* | 2/2013 | Meier | A47G 19/2227 248/682 |
| 2015/0113843 A1* | 4/2015 | Berry | G09F 7/04 40/600 |
| 2016/0003269 A1* | 1/2016 | Russell-Clarke | A41F 1/002 24/303 |
| 2016/0213137 A1* | 7/2016 | Sellars | A45F 5/02 |
| 2017/0043948 A1* | 2/2017 | Badger | B65F 1/06 |

* cited by examiner

MAGNETIC SECURING SYSTEM

CROSS-REFERENCE TO RELATED APPLICATION

This application claims priority of Provisional application 62/335,937 filed on May 13, 2016, the entire disclosure of which is incorporated herein by reference.

FIELD

This disclosure relates to a system for securing articles using magnets.

BACKGROUND

There are many situations in which it would be desirable to be able to easily clip or hang an item from an article of clothing, a bag, or the like.

SUMMARY

Featured in this disclosure is a magnetic securing or hanging system. The subject system is adapted to be removably secured to an article such as clothing, a back-pack or a purse, as several non-limiting examples. The system employs magnets embedded in backers. One backer is placed on one side of the article and the other backer is placed on the other side of the article. The two magnets attract. This holds the backers in place on the article. The system is most useful on thin articles such as those made from fabric (e.g., clothing), where the magnets of the opposed backers are close enough together to securely hold onto the article.

One or both of the backers can include structure that can be used to support another object. This structure can, for example, be a loop, or a hook, as two non-limiting examples. Objects such as temple pieces of eyeglasses can be placed through the loop. The subject system thus can accomplish structure that allows objects to be removably coupled to an article such as clothing or a bag. Also, the system can include an adjunct member that includes a magnet and structure (such as a loop or hook) that can be used to support another object, where the magnet can be magnetically coupled to one of the backers. The adjunct member thus can be a means to add additional functionality to the subject system.

All examples and features mentioned below can be combined in any technically feasible way.

In one aspect, the magnetic securing system includes first and second backers, each with a magnet embedded therein, wherein the first backer is constructed and arranged to be placed on one side of an article, and the second backer is constructed and arranged to be placed on another side of the article such that the two magnets attract, to hold the backers in place on the article, and a first structure that is coupled to or can be coupled to the first backer, wherein the first structure is constructed and arranged to be used to support another object, such that the system is able to allow objects to be removably coupled to the article.

The magnetic securing system can further include one or more of the following features, or any combination thereof. In one example, the first structure comprises a loop. The loop may (or may not) be an integral part of the first backer. The first backer may have a generally round shape with an interior, and the interior may be partially closed and partially open. The partially open portion of the first backer may define the integral loop, and the partially closed portion may carry the embedded magnet. The magnetic securing system may be adapted for use on thin articles such as those made from fabric, where the magnets of the first and second backers are close enough together to securely hold onto the article.

The magnetic securing system can further include one or more of the following features, or any combination thereof. The magnetic securing system may further comprise an adjunct member that includes a magnet, and a second structure that is constructed and arranged to be used to support another object. The adjunct member magnet may be arranged to be magnetically coupled to a backer so that the adjunct member is able to add additional functionality to the system. The second structure may comprise a second loop. The second loop may be an integral part of the adjunct member. The second loop may be arranged to be opened and closed. The second loop may comprise a projection, and an open end portion that is constructed and arranged to receive the projection. The projection may comprise at least one locking nib on a periphery of the projection. The open end portion may comprise at least one guide that is arranged to receive a locking nib. The magnetic securing system may comprise a pair of locking nibs and a pair of guides. The adjunct member magnet may be embedded in the projection of the second loop. The adjunct member may have a flexible strap with two ends, wherein magnets are embedded in the strap ends such that when the ends are brought together the magnets attract and hold the adjunct member in a closed position in which a loop is formed by the strap.

In another aspect, a magnetic securing system includes first and second backers, each with a magnet embedded therein, wherein the first backer is constructed and arranged to be placed on one side of an article, and the second backer is constructed and arranged to be placed on another side of the article such that the two magnets attract, to hold the backers in place on the article, a loop that is an integral part of the first backer, wherein the loop is constructed and arranged to be used to support another object, such that the system is able to allow objects to be removably coupled to the article, and an adjunct member that includes a magnet that is arranged to be magnetically coupled to a backer so that the adjunct member is able to add additional functionality to the system, and a second structure that is constructed and arranged to be used to support another object.

The magnetic securing system can further include one or more of the following features, or any combination thereof. The first backer may have a generally round shape with an interior, and wherein the interior is partially closed and partially open, wherein the partially open portion of the first backer defines the integral loop, and the partially closed portion carries the embedded magnet. The second structure may include a second loop that may be arranged to be opened and closed, and may comprise a projection in which the adjunct member magnet is embedded, and an open end portion that is constructed and arranged to receive the projection, wherein the projection comprises a pair of locking nibs spaced around a periphery of the projection, and a pair of guides that are each arranged to receive a locking nib. The adjunct member may have a flexible strap with two ends, wherein magnets are embedded in the strap ends such that when the ends are brought together the magnets attract and hold the adjunct member in a closed position in which a loop is formed by the strap.

DETAILED DESCRIPTION

Figure 1A:
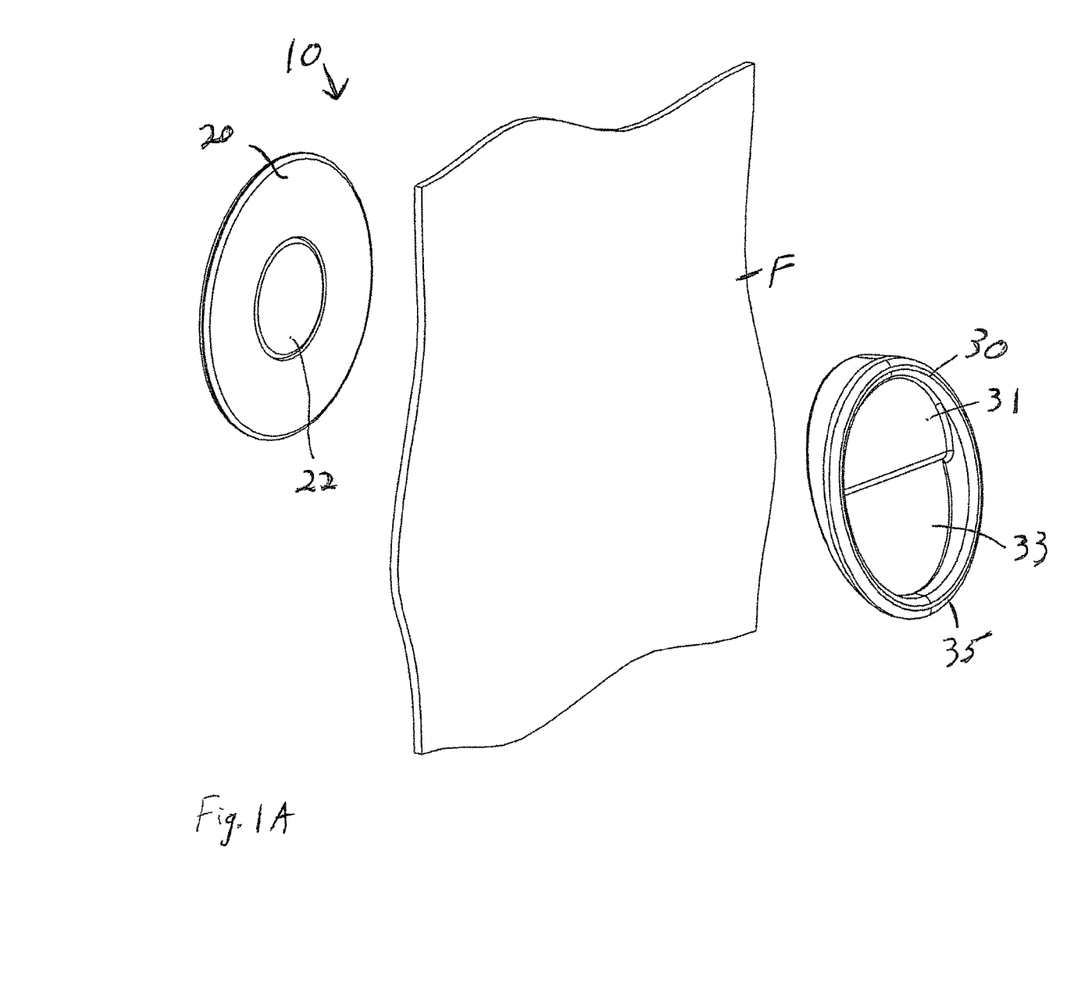
FIG. 1A is an exploded view of a magnetic securing system.
Figure 1B:
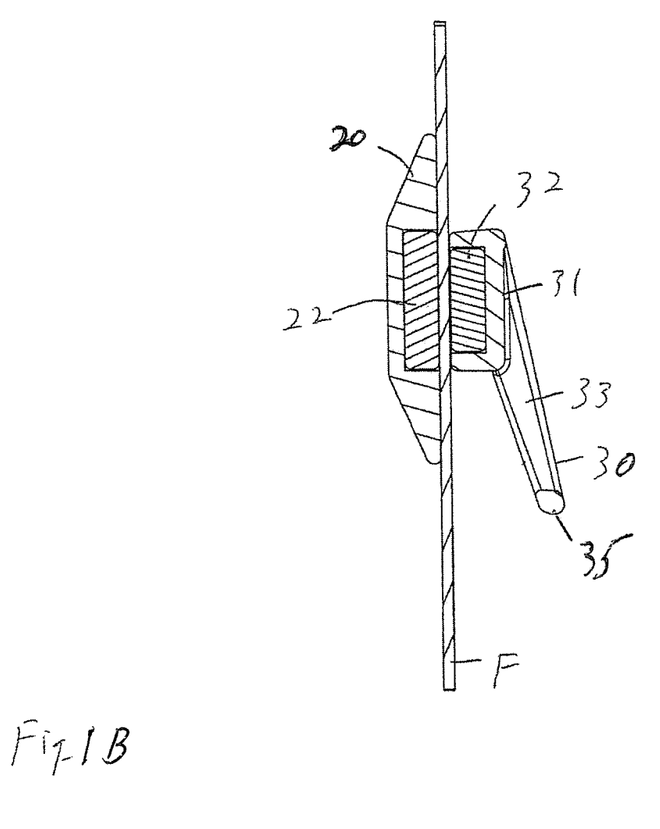
FIG. 1B is a cross-sectional view of the assembled magnetic securing system of FIG. 1A.

Non-limiting examples of the magnetic securing or hanging system are disclosed in the enclosed drawings. FIGS. 1A and 1B illustrate a first example of a magnetic securing system 10 that has first backer 20 and second backer 30. Backers 20 and 30 have embedded magnets 22 and 32, respectively. Backers 20 and 30 can be insert molded around the magnets using a suitable plastic material. Backers 20 and 30 are in this non-limiting example located on opposite sides of fabric F, such that the two magnets hold the backers in place on fabric F. Backer 30 has solid portion 31 that holds magnet 32, and integral loop 35 that defines open area 33. Loop 35 can be (but need not be) angled as shown, such that it projects away from portion 31 (away from fabric F) so as to make open area 33 more accessible. Loop 35 allows objects such as eyeglasses, earbuds, I.D. or security badges, writing implements (e.g., pens, mechanical pencils), sport gear such as gloves with clips, goggles, carabiners, and the like, to be held by the loop and so removably held by the articles that include the fabric (e.g., a shirt, a coat, another article of clothing, a bag, or backpack).

Figure 2A:
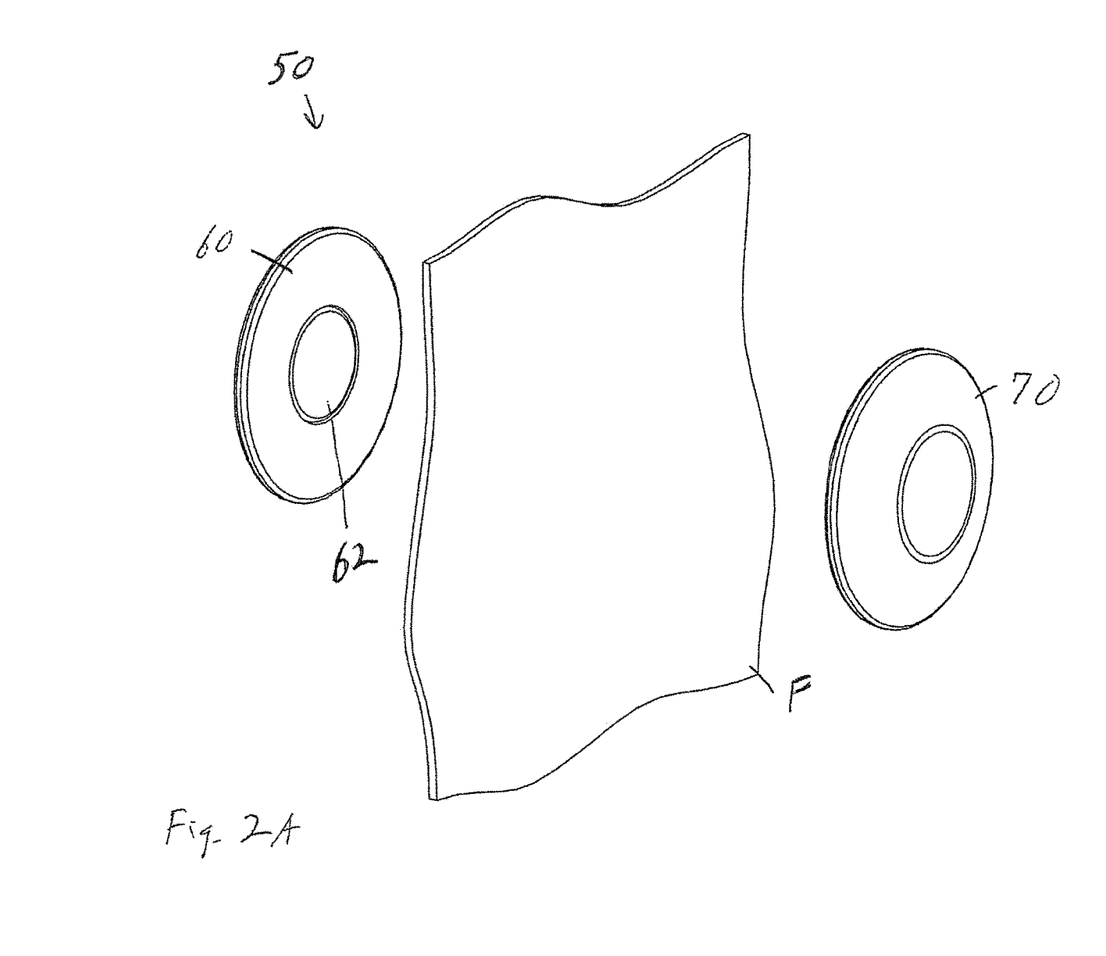
FIG. 2A is an exploded view of a magnetic securing system.
Figure 2B:
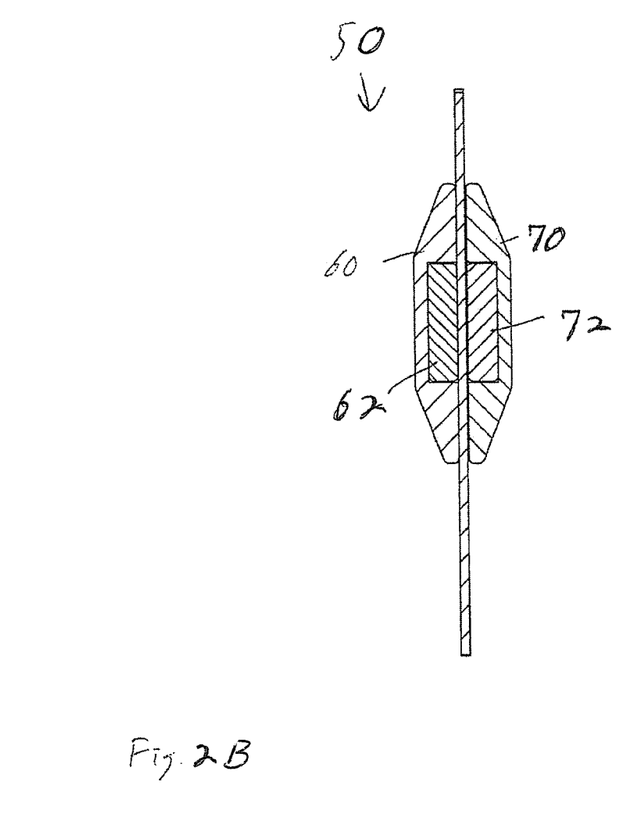
FIG. 2B is a cross-sectional view of the assembled magnetic securing system of FIG. 2A.

FIGS. 2A and 2B illustrate a second example of a magnetic securing system 50 that has backers 60 and 70 with embedded magnets 62 and 72. Backers 60 and 70 are located on opposite sides of fabric F, such that the two magnets hold the backers in place on fabric F. Magnet 72 of outer backer 70, and/or magnet 62 of inner backer 60, can act as an anchoring location for an adjunct member that includes a magnet and structure (such as a clip or loop) that can be used to support another object, where the adjunct member magnet can be magnetically coupled to one of the backers. The adjunct member thus can be a means to add additional functionality to the subject system.

Figure 3A:
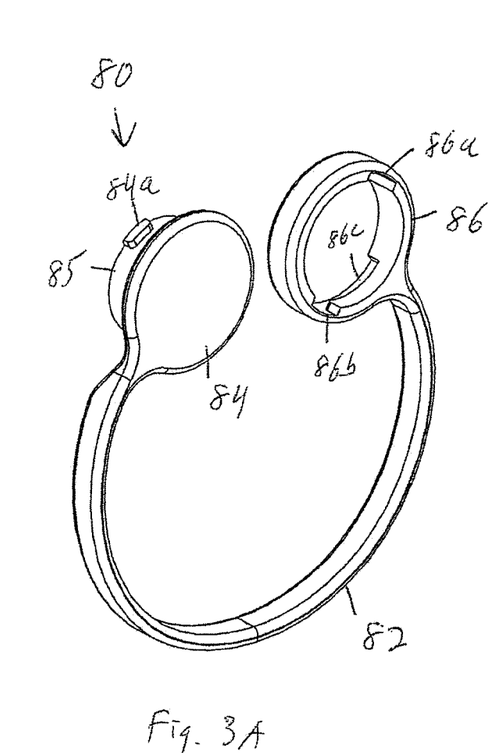
FIGS. 3A and 3B are front and rear perspective views, respectively, of an adjunct member for a magnetic securing system.
Figure 3B:
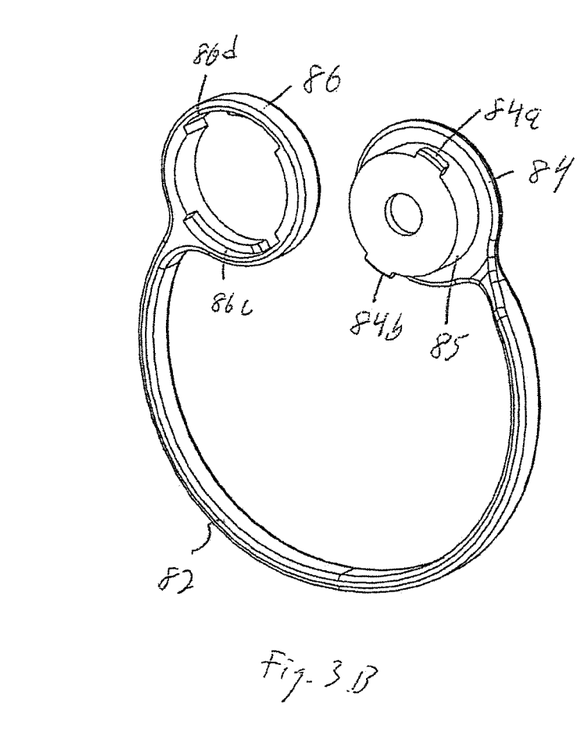

One such adjunct member 80 is shown in FIGS. 3A and 3B. It should be understood that this is but one, specific, non-limiting example of an adjunct member of the present disclosure. The adjunct member can comprise any magnetic member that can couple to a magnet of a backer. The adjunct member includes a loop, hook, or other structure that allows one or more objects to be held to or coupled to the adjunct member. The adjunct member thus can be used to allow an object to be held by any article to which the magnetic securing system is coupled, with or without the backer with integral loop as shown in FIG. 1. Adjunct member 80 is shown magnetically coupled to backer 70 in FIG. 4.

Figure 4:
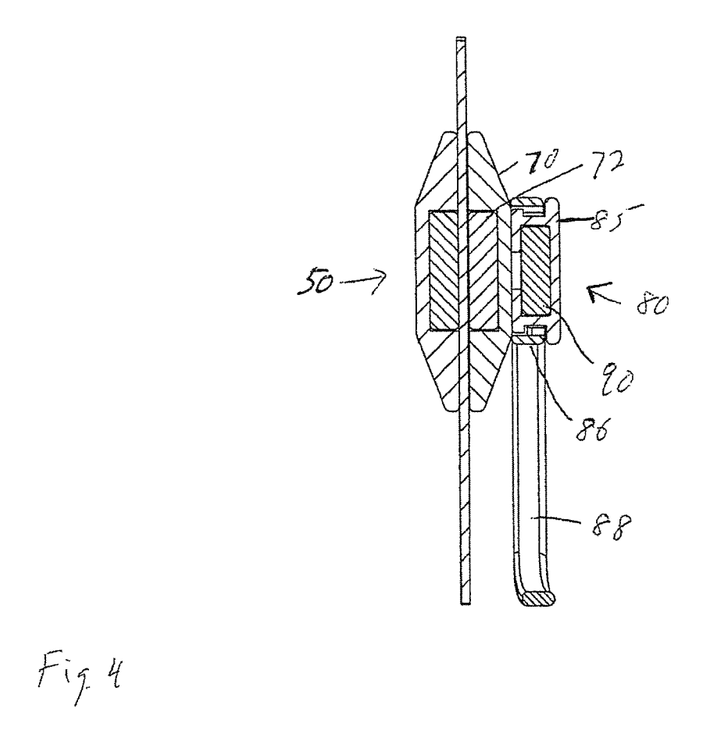
FIG. 4 is a cross-sectional view of the adjunct member of FIGS. 3A and 3B in use with the magnetic securing system of FIGS. 2A and 2B.

Adjunct member 80 comprises ring 82 that, when closed, defines open area 88 which is similar in function to open area 33, FIG. 1. Member 80 is designed to be manipulated such that ring 82 can be opened and closed; the open state is shown in FIGS. 3A and 3B while the closed state is shown in FIG. 4. The ring can be opened so that it can be coupled to an object that can't appropriately access a closed loop (such as the loop shown in FIG. 1); one example would be a key ring. Then the ring can be closed around the object.

The non-limiting manner in which these open and closed states are accomplished in this example is with a solid end 84 with projection 85 in which magnet 90 is embedded. Projection 85 has locking nibs 84a and 84b that fit into receiving slots 86a and 86b of open end portion 86 that is adapted to receive projection 85. Circumferential guides 86c and 86d are connected to slots 86a and 86b. Projection 85 can be inserted into end portion 86 and then rotated relative to end 84, with nibs 84a and 84b moving along guides 86c and 86d. Rotation proceeds until nibs 84a and 84b are not aligned with slots 86a and 86b. This locks projection 85 into end portion 86 and thus prevents projection 85 from being removed from end portion 86. This locking feature maintains ring 82 in the closed state.

FIG. 4 illustrates adjunct member 80 magnetically coupled to backer 70 of system 50. Open area 88 extends below interlocked projection 85 and open end portion 86. An object can be located in or coupled to open area 88 of ring 82. System 50 thus acts as an anchoring location for the adjunct member, so that the adjunct member can be used to support another object as described above.

Figure 5A:
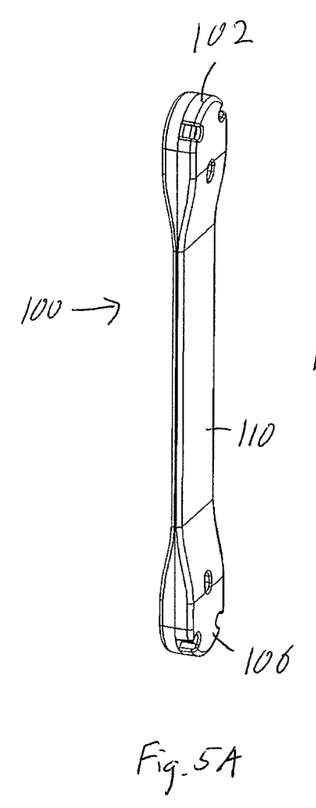
FIGS. 5A and 5B are open and closed vies, respectively, of another adjunct member for a magnetic securing system.
Figure 5B:
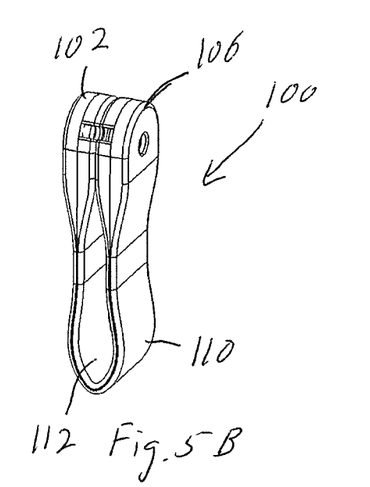
Figure 6:
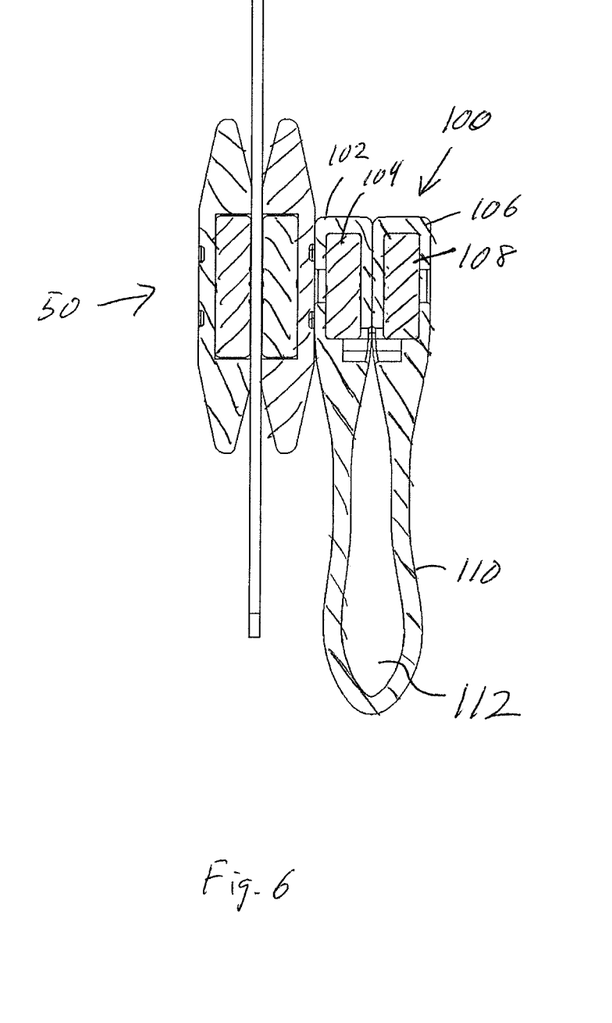
FIG. 6 is a cross-sectional view of the adjunct member of FIGS. 5A and 5B in use with the magnetic securing system of FIGS. 2A and 2B.

FIGS. 5A and 5B are open and closed views of another adjunct member 100. Member 100 is in the form of a flexible strap 100 with magnets 104 and 108 embedded in ends 102 and 106, respectively; see FIG. 6. When ends 102 and 106 are brought together the magnets attract and hold member 100 in the closed position in which loop 112 is formed. As shown in FIG. 6, member 100 can be coupled to magnetic securing system 50 in much the same way that adjunct member 80 can be.

A number of implementations have been described. Nevertheless, it will be understood that additional modifications may be made without departing from the scope of the inventive concepts described herein, and, accordingly, other embodiments are within the scope of the following claims. The invention is defined by the claims, and includes equivalents to the claimed subject matter.

What is claimed is:

1. A magnetic securing system, comprising:
first and second backers, each with a magnet embedded therein, wherein the first backer has a shape and comprises an interior that is partially closed and partially open, and is constructed and arranged to be placed on one side of an article, and the second backer is constructed and arranged to be placed on another side of the article such that the two magnets attract, to hold the backers in place on the article; and
a first structure that is coupled to or can be coupled to the first backer, wherein the first structure is constructed and arranged to be used to support another object, such that the system is able to allow objects to be removably coupled to the article, wherein the first structure comprises a loop that is integral part of the first backer, and wherein the partially open portion of the first backer defines the integral loop, and the partially closed portion carries the embedded magnet.

2. The magnetic securing system of claim 1, wherein the first backer has a generally round shape.

3. The magnetic securing system of claim 1, further comprising an adjunct member that comprises a magnet and a second structure that is constructed and arranged to be used to support another object.

4. The magnetic securing system of claim 3, wherein the adjunct member magnet is arranged to be magnetically coupled to a backer so that the adjunct member is able to add additional functionality to the system.

5. The magnetic securing system of claim 3, wherein the second structure comprises a second loop.

6. The magnetic securing system of claim 5, wherein the second loop is an integral part of the adjunct member.

7. The magnetic securing system of claim 5, wherein the second loop is arranged to be opened and closed.

8. The magnetic securing system of claim 7, wherein the second loop comprises a projection, and an open end portion that is constructed and arranged to receive the projection.

9. The magnetic securing system of claim 8, wherein the projection comprises at least one locking nib on a periphery of the projection.

10. The magnetic securing system of claim 9, wherein the open end portion comprises at least one guide that is arranged to receive a locking nib.

11. The magnetic securing system of claim 10, comprising a pair of locking nibs and a pair of guides.

12. The magnetic securing system of claim 8, wherein the adjunct member magnet is embedded in the projection of the second loop.

13. The magnetic securing system of claim 3, wherein the adjunct member comprises a flexible strap with two ends, wherein magnets are embedded in the strap ends such that when the ends are brought together the magnets attract and hold the adjunct member in a closed position in which a loop is formed by the strap.

14. The magnetic securing system of claim 1, for use on thin articles such as those made from fabric, where the magnets of the first and second backers are close enough together to securely hold onto the article.

15. A magnetic securing system, comprising:
first and second backers, each with a magnet embedded therein, wherein the first backer has a generally round shape and comprises an interior that is partially closed and partially open, and is constructed and arranged to be placed on one side of an article, and the second backer is constructed and arranged to be placed on another side of the article such that the two magnets attract, to hold the backers in place on the article;
a loop that is an integral part of the first backer, wherein the loop is constructed and arranged to be used to support another object, such that the system is able to allow objects to be removably coupled to the article, wherein the partially open portion of the first backer defines the integral loop, and the partially closed portion carries the embedded magnet; and
an adjunct member that includes a magnet that is arranged to be magnetically coupled to a backer so that the adjunct member is able to add additional functionality to the system, and a second structure that is constructed and arranged to be used to support another object.

16. The magnetic securing system of claim 15, wherein the second structure comprises a second loop that is arranged to be opened and closed, and comprises a projection in which the adjunct member magnet is embedded, and an open end portion that is constructed and arranged to receive the projection, wherein the projection comprises a pair of locking nibs spaced around a periphery of the projection, and a pair of guides that are each arranged to receive a locking nib.

17. The magnetic securing system of claim 15, wherein the adjunct member comprises a flexible strap with two ends, wherein magnets are embedded in the strap ends such that when the ends are brought together the adjunct member magnets attract and hold the adjunct member in a closed position in which a loop is formed by the strap.

18. A magnetic securing system, comprising:
first and second backers, each with a magnet embedded therein, wherein the first backer is constructed and arranged to be placed on one side of an article, and the second backer is constructed and arranged to be placed on another side of the article such that the two magnets attract, to hold the backers in place on the article;
a first structure that is coupled to or can be coupled to the first backer, wherein the first structure is constructed and arranged to be used to support another object, such that the system is able to allow objects to be removably coupled to the article; and
an adjunct member that comprises a magnet and a second structure that is constructed and arranged to be used to support another object, wherein the second structure comprises a second loop.

* * * * *